United States Patent [19]

Green et al.

[11] Patent Number: 4,628,040
[45] Date of Patent: Dec. 9, 1986

[54] METHOD OF MAKING UNIFORM SPHEROIDAL CATALYST BEADS

[75] Inventors: Gary J. Green, Yardley; Albert B. Schwartz, Philadelphia, both of Pa.

[73] Assignee: Mobil Oil Corporation, New York, N.Y.

[21] Appl. No.: 776,924

[22] Filed: Sep. 17, 1985

Related U.S. Application Data

[63] Continuation-in-part of Ser. No. 596,990, Apr. 5, 1984.

[30] Foreign Application Priority Data

Mar. 25, 1985 [CA] Canada .................................. 477372

[51] Int. Cl.$^4$ ............................................. B01J 35/08
[52] U.S. Cl. ............................................. 502/9; 502/8
[58] Field of Search ........................................ 502/8, 9

[56] References Cited

U.S. PATENT DOCUMENTS

| | | |
|---|---|---|
| 2,620,314 | 12/1952 | Hoekstra et al. |
| 3,023,171 | 2/1962 | Smith ................................ 502/8 X |
| 3,558,508 | 1/1971 | Keith et al. |
| 3,872,217 | 3/1975 | Merz et al. |
| 3,886,086 | 5/1975 | Simpson et al. ................ 502/8 X |
| 3,986,978 | 10/1976 | Michalko. |
| 4,179,408 | 12/1979 | Sanchez et al. ........................ 502/8 |
| 4,318,896 | 3/1982 | Schoonover. |

OTHER PUBLICATIONS

"Preparation of Spherically Shaped Alumina Oxide", International Chemical Engineering, vol. 14, No. 1, pp. 90-93, Jan. 1974.

Katsobashvili et al, "Formation of Spherical Alumina and Aluminum Oxide Catalysts by the Hydrocarbon-Ammonia Process—1. The Role of Electrolytes in the Formation Process," Kolloindnyi Zhurnal, vol. 28, No. 1, pp. 46-50, Jan.-Feb. 1966.

Katsobashvili et al, "Preparation of Mechanically Strong Alumina and Aluminum Oxide Catalysts in the Form of Spherical Granules by the Hydrocarbon-Ammonia Forming Method", Zhurnal Prikladnoi Khimii, vol. 39, No. 11, pp. 2424-2429, Nov. 1966.

Katsobashvili et al, "Formation of Spherical Alumina and Aluminum Oxide Catalysts by the Hydrocarbon-Ammonia Process-Coagulational Structure Formation During the Forming Process", Kolloindnyi Zhurnal, vol. 29, No. 4, pp. 503-508, Jul.-Aug. 1967.

Primary Examiner—W. J. Shine
Attorney, Agent, or Firm—Alexander J. McKillop; Michael G. Gilman; Charles J. Speciale

[57] ABSTRACT

Uniform droplets of a bead-forming liquid are produced by positioning the end of a capillary tube in the throat of a venturi. An immiscible fluid flowing through the venturi detaches the droplets from the end of the capillary tube to produce uniform, spherical droplets which harden into spheroidal beads which have a uniform size.

14 Claims, 6 Drawing Figures

METHOD OF MAKING UNIFORM SPHEROIDAL CATALYST BEADS

This application a continuation-in-part of "Droplet Generating Apparatus", Ser. No. 596,990, filed Apr. 5, 1984.

BACKGROUND OF THE INVENTION

This invention relates to the production of uniform spheroidal beads and more particularly to apparatus and a method for producing uniform spherical droplets of materials which subsequently form solid, uniform beads.

The bead forming material is typically a hydrosol, or slurry containing silica, alumina, or silica-alumina. The beads are typically metal oxides which are used as a catalyst, a catalyst support, or matrix, an adsorbent, or an ion exchange material.

Spheroidal beads offer distinct advantages when employed in fixed bed reactor applications; for example, improved packing efficiencies and increased attrition resistance are realized.

The physical and structural properties of a catalyst significantly influence its activity and durability. More particularly, the physical and structural properties of the catalyst support or base material significantly influence activity and durability. The pore structure including size distribution and volume determines the extent and accessibility of surface area available for contact of the catalytic material and the reactants. Catalytic activity often depends on the rate of diffusion of reactants and products in and out of the interstices of a catalyst. Increased pore size may facilitate the diffusion of reactants and reaction products, but catalytic activity is also a function of surface area and packing density.

Spheroidal catalyst beads have many advantages over other shapes because they permit uniform packing so that variations in pressure drop are minimized and the tendency of a reactant stream to channel through the bed out of effective contact with the catalyst is reduced. Better flow properties, in the case of a moving bed system, are produced.

The foregoing and other desirable catalyst properties are discussed in U.S. Pat. No. 4,318,896—Schoenover which also discusses the five general methods of preparing spheroidal particles of a size suitable for commercial operation. Of these, the spray drying method and the method of dropping particles into an oil bath are widely used. In these methods, drops of a catalyst forming liquid are produced and allowed to harden. The hardening takes place in a stream of air in the spray drying technique and in a water immiscible liquid such as oil in the other technique.

Processes for manufacturing alumina particles are shown, for example, in U.S. Pat. Nos. 3,558,508, 4,179,408 and 4,318,896. Processes for manufacturing silica particles are shown in U.S. Pat. No. 3,872,217 and processes for manufacturing silica-alumina particles as shown for example, in U.S. Pat. No. 3,986,978.

It has long been known to prepare catalyst supports, especially spheroidal alumina particles, by the well-known oil-drop method, described by Hoekstra in U.S. Pat. No. 2,620,314. Briefly, the method comprises commingling an acidic alumina hydrosol with a gelling agent characterized as a weak base which hydrolyzes to ammonia with increasing temperature, and dispersing the mixtures as droplets in a hot oil bath generally contained in a vertical column or forming tower. The forming oil is typically a light or heavy gas oil chosen principally for its high interfacial tension with respect to water. Thus, as each droplet penetrates the oil surface, it draws into a spherical shape. The droplets are principally water at this stage and, being insoluble in the oil, they tend to assume a shape having the least surface area for its volume. A second effect is that the formed hydrosol droplets gravitating to the bottom of the forming oil are progressively gelled to a stage sufficient to maintain the structural integrity of the resulting hydrogel spheres during the subsequent processing thereof. In any case, the formed hydrogel spheres are subsequently aged, usually in the hot forming oil and thereafter washed, dried and calcined, usually in an oxidizing atmosphere at 425° to 750° C.

The above-described method basically uses an internal gelling agent, such as hexamethylenetetramine, that is added to the feed before drop formation and that releases ammonia in the hot oil bath. U.S. Pat. No. 3,558,508 to Keith et al. describes an oil-drop method employing an external gelation technique in which gaseous ammonia is introduced into the bottom of a column containing the water-immiscible liquid and coagulates the droplets by contacting their external surfaces. The Keith et al. process is based to a considerable extent on the use of specific alumina feed prepared by acidic hydrolysis of finely divided aluminum.

Spherical alumina particles may also be formed by the hydrocarbon/ammonia process described in Olechowska et al., "Preparation of Spherically Shaped Alumina Oxide", INTERNATIONAL CHEMICAL ENGINEERING, Volume 14, No. 1, pages 90–93, January, 1974. In this process, droplets of a slurry of nitric acid and dehydrated aluminum hydroxide fall through air into a column containing hydrocarbon and ammonia phases. The droplets assume spheroidal shapes in passing through the water-immiscible liquid and then are coagulated to firm spheriodal beads or pellets in the coagulating medium. Similar processes utilizing pseudosol feeds and hydrochloric acid are described in:

1. Katsobashvili et al., "Formation of Spherical Alumina and Aluminum Oxide Catalysts by the Hydrocarbon-Ammonia Process—1. The Role of Electrolytes in the Formation Process", KOLLOINDNYI ZHURNAL. Vol. 28, No. 1, pp. 46–50, January-February, 1966;

2. Katsobashvili et al, "Preparation of Mechanically Strong Alumina and Aluminum Oxide Catalysts in the form of Spherical Granules by the Hydrocarbon-Ammonia Forming Method", ZHURNAL PRIKLADNOI KHIMII, Vol. 39, No. 11, pp. 2424–2429, November 1966; and 3. Katsobashvili et al., "Formation of Spherical Alumina and Aluminum Oxide Catalysts by the Hydrocarbon-Ammonia Process-Coagulational Structure Formation During the Forming Process", KOLLOINDNYI ZHURNAL, Vol. 29, No. 4 pp. 503–508, July-August, 1967.

Subsequent aging of the catalyst droplets in an aqueous bath may lead to stress cracks or fractures, because of different salt concentrations in the bath. The problems of stress cracks or fractures due to salt concentration gradients, and one method solution of these problems, is disclosed in U.S. Pat. No. 4,250,058.

Whenever catalysts are transferred from an oil phase to an aqueous phase, there is an interface which tends to accumulate any dirt which may be present in the system and hold up some particles of catalyst.

It is possible to minimize the problems of getting catalyst particles through the interface by adding a surfactant or detergent to the water phase, but this represents added cost and added complications.

The spheroidal beads produced by the prior art are not as uniform as is desired. Uniformity of bead size enhances uniform packing which is desirable for the reasons previously discussed. Further, the beads produced by prior art techniques are often not as large as desired.

It is an object of the present invention to produce uniform droplets which harden into uniform size spheroidal beads in either the spray drying or oil bath hardening technique.

SUMMARY OF THE INVENTION

In accordance with the present invention, uniform droplets of a bead-forming liquid are produced by a capillary tube, the tip of which is positioned in the throat of a venturi through which immiscible fluid flows. The immiscible fluid induces premature detachment of incompletely formed droplets of a hydrosol or slurry from the tip of the capillary tube. In one embodiment, the droplet detachment is accomplished by an annular flow of gas, such as air, past the capillary tip. By varying the bead-forming liquid flow through the capillary, the gas flow past the tip, the orifice size of both the capillary and the venturi, the droplet size and production rate can be precisely controlled. Total throughput for a given rate can be precisely controlled.

Total throughput for a given droplet size may be increased using this concept by utilizing an array of such venturi/capillary nozzles. The uniform, spherical droplets produced by this scheme can then be post-treated or processed as necessary by hot air drying or pH-adjusted gelation in an aging bath, for example, depending on the specific composition of the hydrosol or slurry.

In another embodiment, the tip of the capillary is immersed in an oil bath and the fluid which detaches the droplets is oil which flows past the tip of the capillary.

The process of the present invention offers several advantages over the prior art oil-dropping methods, both internal and external gelling systems.

One advantage is that the droplets formed by our process are spherical, and tend to remain spherical within the immediate proximity of the droplet generating apparatus. Another advantage is that the droplets are extremely uniform in size. This is in contrast to the prior art methods which form irregularly-shaped, non-uniformly sized particles, which then assume the shape of spheres in the hot oil bath due to forces of surface tension.

In contrast, the process of the present invention does not tend to distort the liquid droplets. The droplet generating apparatus can be run horizontally, pointing up or pointing down, or any intermediate position.

As applied to catalyst manufacture, an internal gelling agent can be used, activated by hot air or other hot vapor, rather than hot oil.

In one embodiment, the droplet generating apparatus can be operated pointing upwards, discharging droplets of alumina sol plus a gelling agent up through the throat of a venturi through which flows air or other gas at a temperature of 100°–1,000° C. or even higher.

Spheres are formed and carried upward at an initial velocity of 2–10 m/s, for a vertical travel of 2–20 meters, or more, depending upon the amount of the time required to obtain a minimal amount of gelation and lock in the spherical shape. At the top of the catalyst particles' travel, the partially gelled catalyst may be deflected either mechanically, or preferably with a jet of a vapor or liquid, into a conventional hot oil bath or an aqueous ammoniacal aging bath. By proper selection of operating variables, it is possible to eliminate entirely the conventional oil bath, and its attendant problems, and go directly from the droplet forming apparatus into a conventional aqueous aging solution.

It is also possible to simply substitute the droplet forming apparatus of the present invention for the droplet forming device used in conventional hot oil forming methods.

In accordance with the invention, the venturi includes a converging/diverging nozzle which forms droplets with good trajectory and with the desired droplet size and spacing. In accordance with the present invention, larger beads can be produced than the prior art spray drying technique and more uniform droplets are produced than the prior art.

The present invention relies only on the droplet generation method itself to produce spherically-shaped particles. This is an advantage over prior art techniques of producing uniform beads by milling, or the like.

The foregoing and other objects, features and advantages of the invention will be better understood from the following more description and appended claims.

SHORT DESCRIPTION OF THE DRAWINGS

DESCRIPTION OF THE PREFERRED EMBODIMENT

Figure 1:
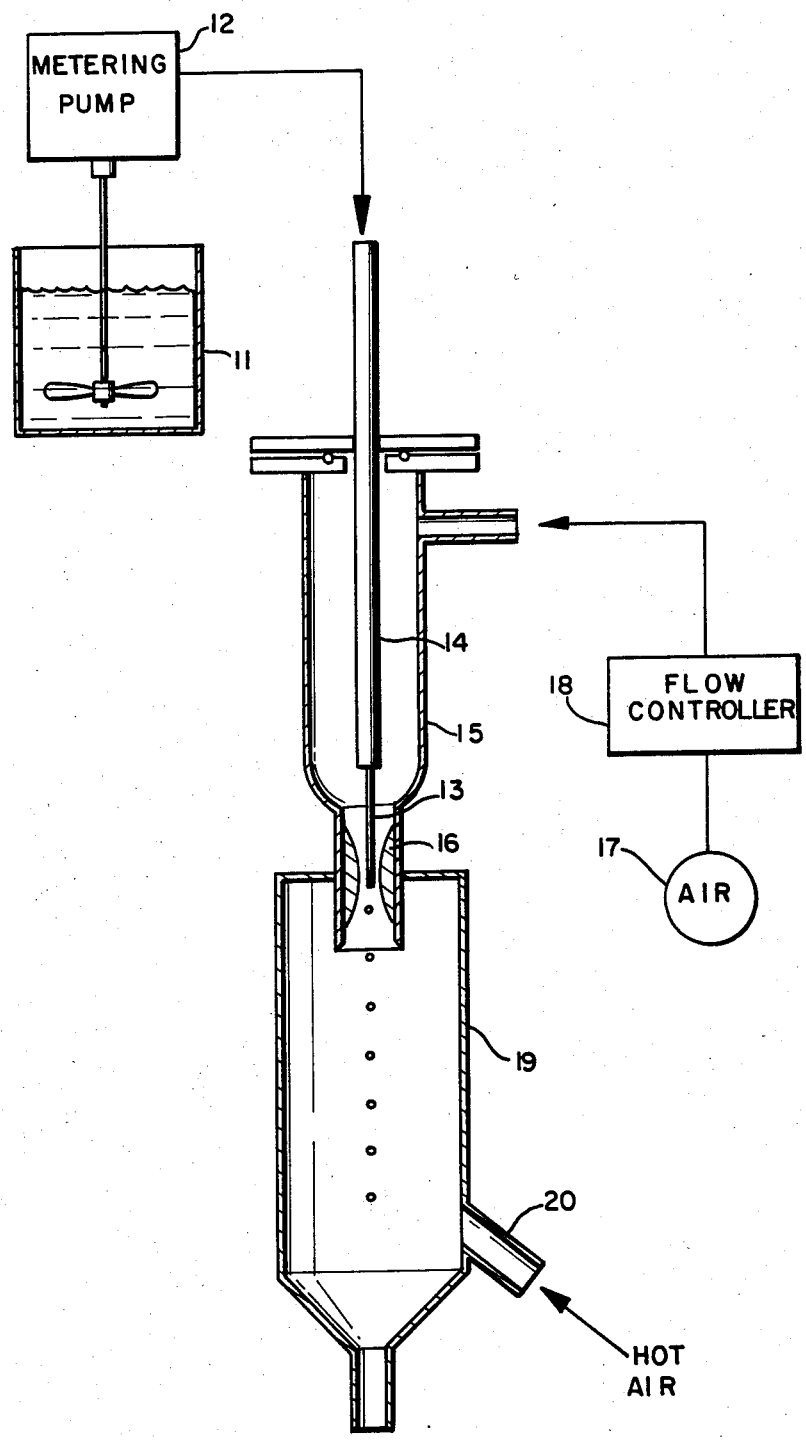
FIG. 1 shows the droplet formation by a single capillary tube and venturi.

FIG. 1 shows a source of catalyst support-forming liquid 11, commonly a slurry or hydrosol such as acidic alumina hydrosol. The present invention can be used to produce catalyst support beads of various different materials, but those of alumina, silica alumina, and silica are typical. A metering pump 12 delivers the catalyst support-forming liquid to the droplet producing apparatus of the present invention.

The droplet producing apparatus includes a capillary tube 13 having a liquid receiving end which is connected to the tube 14, which contains liquid from metering pump 12. An outer concentric tube 15 has a venturi 16 at the bottom thereof. The tip of the capillary tube is positioned in the throat of the venturi 16.

Venturi 16 is a converging/diverging nozzle with the diverging nozzle section having a half angle of 7.5° in an exemplary embodiment. The converging/diverging nozzle insures a better trajectory of the droplets than other venturis.

Air or ammonia from source 17 is supplied through flow controller 18 which regulates the flow of gas through the venturi to control the formation of droplets from the tip of the capillary tube. By varying the liquid flow, gas flow and capillary size, the droplet size, spacing, frequency, and initial velocity may be precisely controlled.

A stream of droplets is produced by inducing premature detachment of incompletely formed droplets at the tip of the capillary 13. This detachment is accomplished by drag caused by the annular flow of gas past the capillary tip which is positioned in the throat of the venturi 16. The gas is accelerated past the tip of the capillary tube by the venturi and then decelerated upon exit from the throat of venturi 16. Droplets thus formed are more uniform in diameter than those that would result from natural detachment due to the weight of the droplet overcoming the interfacial tension at the capillary tip and more uniform than those produced by a spray nozzle commonly employed in catalyst production.

The critical relationship between the size of the venturi throat and the diameter of the capillary tube will depend on the type of beads to be produced. Bead-forming liquids commonly have a viscosity in the range of 200 to 1600 centipoise.

Typical beads produced in spray drying have a diameter of 20 to 150 microns. With the practice of the present invention, beads of 200 microns or larger, up to $\frac{1}{8}$", can be produced.

The droplets exiting from the tip of the capillary tube are hardened in a drying duct 19. The beads are removed from the bottom of drying duct 19. Hot air, approximately 900° F.–1,000° F., is supplied through conduit 20 to the bottom of the duct. The hot air flows counter-current to the droplets falling through the duct, thereby increasing their residence time.

Figure 2:
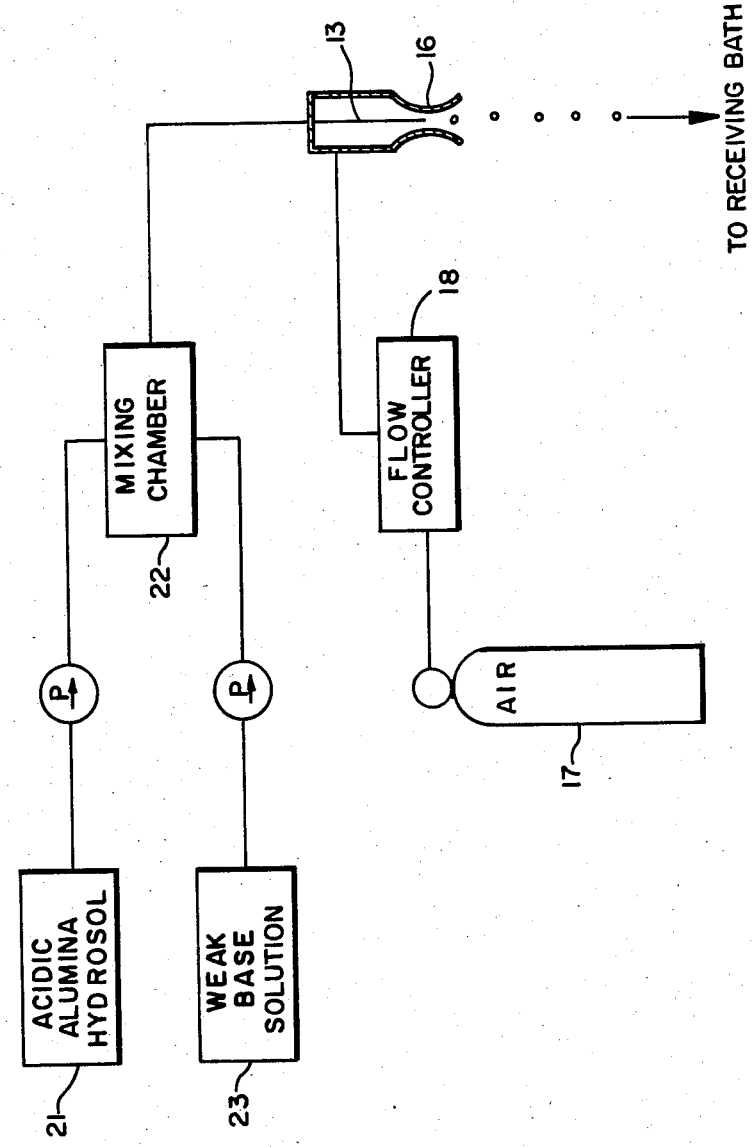
FIG. 2 is a schematic of a droplet generator for production of uniform alumina hydrogel droplets.

FIG. 2 shows a schematic diagram of the droplet generator configured for use in producing uniform, spherical beads from a source 21 of acidic alumina hydrosol and a source 23 of a weak base solution. As another example, silica-containing hydrogel droplets are formed from a sodium silicate solution (Q Brand, for example) from source 21 which is pumped to a mixing chamber 22 where it is acidified with a solution of sulfuric acid from source 23. The solutions are mixed in mixing chamber 22.

After the gelation process starts, the pumping rates, mixing chamber dimensions, and the distance to the venturi 16, must give a residence time less than that required for complete gelation/solidification in order to avoid clogging the orifice. The hydrosol flow rate, air flow rate past the capillary tip, and the diameter of the capillary are chosen to provide the desired droplet size and rate of production. The hydrosol droplets thus formed by the venturi device are then allowed to fall freely and solidify and/or be received in an oil bath or other medium for aging and subsequent base exchange. This method is particularly effective for producing uniform hydrogel droplets having diameters larger than 0.5 mm, especially in the range 1 to 3 mm; these sizes are commensurate with those desired for catalyst beads for fixed bed applications.

Such droplet formation may also be accomplished for other materials of interest as catalysts or catalyst supports, such as alumina or silica-alumina. The method of droplet production is materially the same as described above; only the preparation of the mixture to be delivered to the venturi need be altered. Of course the pumping rates of any constituents which need to be mixed, as well as the mixing chamber dimensions and distance to the venturi, may be modified as necessary to achieve the proper results for that particular composition. Details of such compositions for alumina or silica-alumina preparation are available in prior patents.

Figure 3:
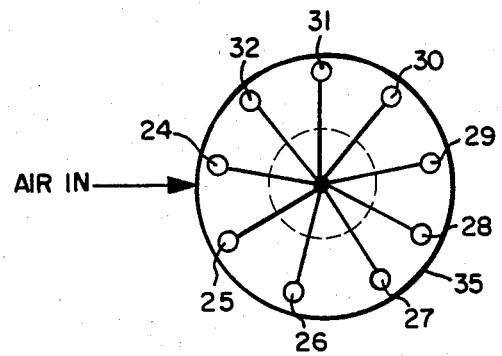
FIG. 3 is a bottom view of a multiple capillary tube and venturi array for production of uniform silica hydrogel droplets.
Figure 4:
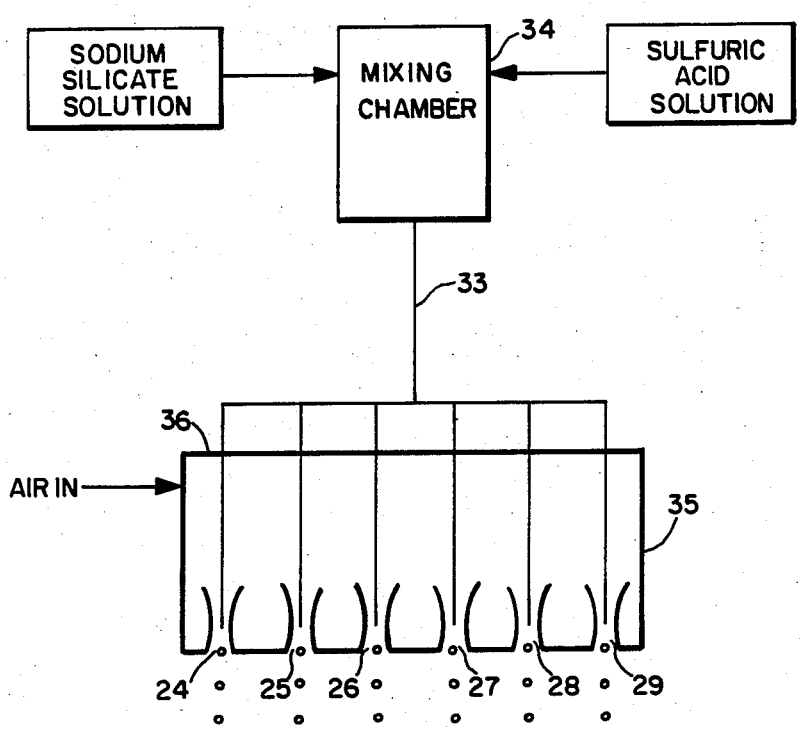
FIG. 4 is a bottom view of the array of FIG. 3.

FIGS. 3 and 4 show the application of the invention to a commercial process wherein an array of capillary tubes and outer concentric tubes having venturis at the bottom thereof are employed. An array of or arrays of capillary/venturis, which may be used to provide the large throughput demanded by preparation of catalysts on an industrial scale. Multiple venturis 24–32 are arranged in a circle around a common feed line 33. The circular arrangement ensures identical residence times for the hydrogel after leaving the mixing chamber 34. The venturis are part of a common housing 35 into which a metered flow of air is admitted, the air passing first through a flow uniformizer 36 before entering the venturis.

Figures 5, 6:
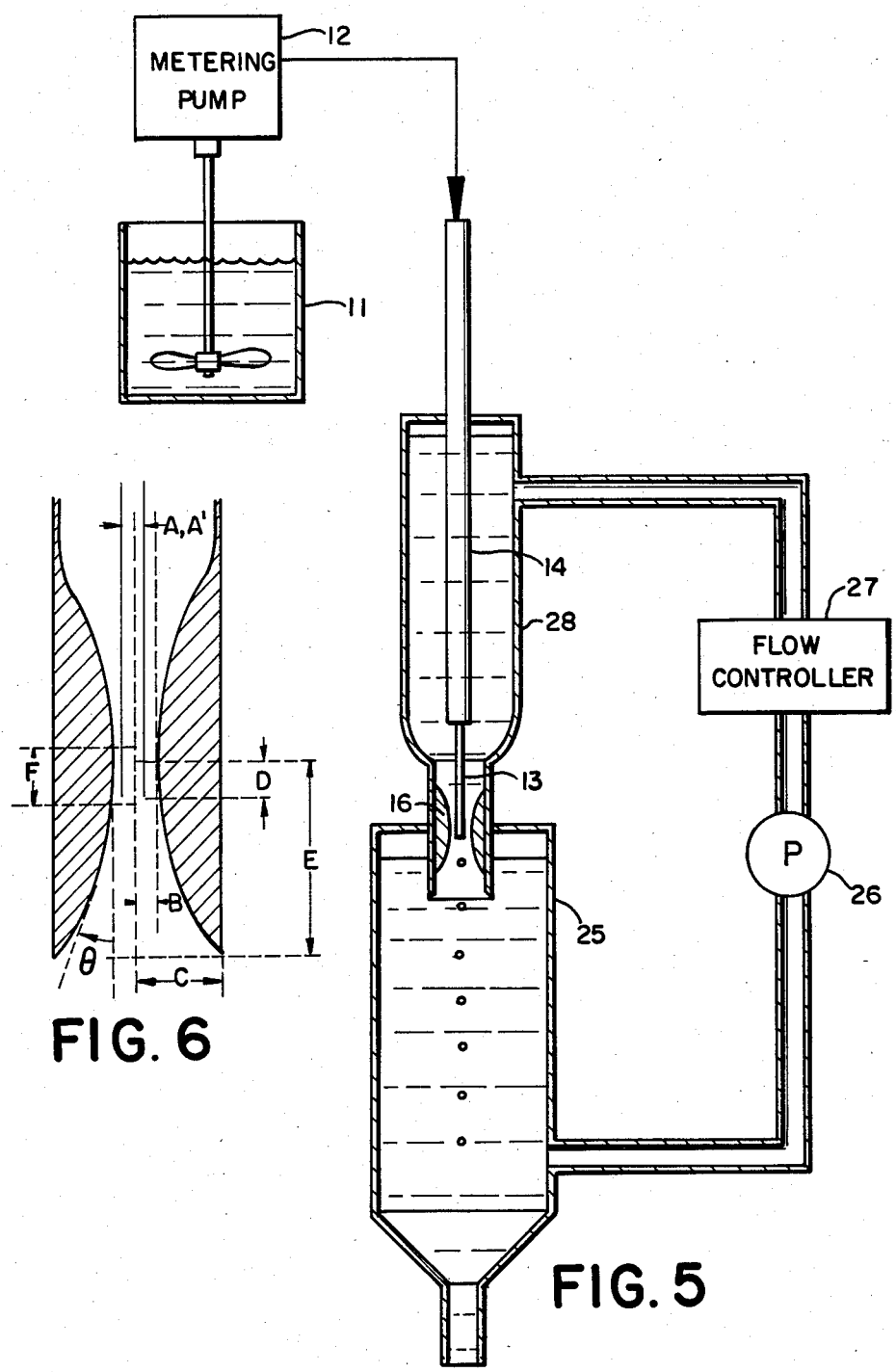
FIG. 5 shows an alternative embodiment wherein flowing oil detaches the droplets from the capillary.
FIG. 6 shows the usable dimensions of the venturi.

FIG. 5 shows an embodiment wherein oil is the fluid flowing around the capillary to detach droplets. Like reference numerals depict the droplet formation apparatus, including capillary 13 and venturi 16. Droplets from the end of the venturi are deposited into the oil tank 25. Oil from the tank is pumped by pump 26 through flow controller 27 to the outer container 28. The oil flows downwardly through the venturi 16, thereby detaching droplets of bead-forming material from the end of the capillary tube. This embodiment of the invention is particularly suitable for use where an oil bath is used for the hardening of the beads.

Any of the conventional materials used to form metal oxide beads may be used in the process of the present invention. The invention is not limited to particular starting materials, but provides a better way to convert known metal oxide precursors into beads.

When alumina is the desired catalyst support, an alumina source and a gelling agent must be used. Preferably, an acidic alumina hydrosol is the alumina source. This can be prepared by the hydrolysis of an alumina salt in aqueous solution. It is possible to start with aluminum pellets, and digest these in a suitable acid, such as hydrochloric acid, to form an alumina salt.

It is also possible to start with dried alumina powders or washed alumina filter cake.

Any conventional gelling agent or system, whether internal or external, may be used. Suitable internal gelling agents include hexamethylenetetramine, hexamethylenediamine, and other conventional internal gelling agents.

Suitable external gelling agents include ammonia, or aqueous ammoniacal solutions, etc. Hot air containing a gelling agent in vapor form (ammonia) or a mist of an amine gelling agent may be used.

The fluid flowing through the venturi may be either a vapor or liquid. Use of hot oil as a fluid to form metal oxide spheres works well, because of the surface tension effects discussed in conjunction with the oil dropping method. Any relatively immiscible fluid may be used.

Either all internal, or all external, or a combination of internal and external gelling may be used in the process of the present invention for forming catalyst spheres.

Although the above discussion has been directed towards alumina catalyst supports, the same general techniques may be used whenever a liquid phase or pumpable slurry of a metal oxide precursor is formed into a sphere using the process and apparatus of the present invention. Other well-known catalyst-support starting materials include silica alumina, zirconia, titania or mixtures thereof, and other similar materials.

CATALYST PRECURSOR LIQUID PROPERTIES

Regardless of the particular catalyst precursor chosen, and regardless of the metals or other additives added to the catalyst precursor, the liquid catalyst precursor must satisfy a number of constraints.

It must be either a liquid or solid/liquid slurry which is pumpable.

The viscosity of the catalyst precursor solution may be any viscosity which has been found suitable for use in prior art catalyst forming processes, although somewhat greater latitude in viscosity is permissible because the process of the present invention does a better job of forming spheres than the prior art processes. Accordingly, viscosities may range from materials with a viscosity approaching that of water, a centipoise of one, up to materials which are just barely pumpable. Expressed as centipoise, the viscosity may range from 1 to perhaps as much as 2,000 centipoise, although viscosities this high are difficult to pump. The preferred viscosities range from about 20 to 1600 cps, although viscosities ranging between 20 and 300 cps most closely approximate those used in conventional catalyst forming processes and are preferred for use herein.

CATALYST ADDITIVES

The catalyst precursor materials discussed above form, e.g., alumina, which is usually used as a support for other catalytic components. These other catalytic components may range from hydrogenation/dehydrogenation components to crystalline additive materials.

Conventional catalytic elements which may be added include metals or compounds thereof of the periodic table.

When the catalyst is destined for use in catalytic converters in automobiles, the catalytic elements would usually be platinum, palladium, or rhodium compounds mixed in with the alumina sol, or other support.

When the catalyst is destined for use in hydrotreating units, the catalytic elements may be one or more of the conventional hydrogenation/dehydrogenation promoters, e.g., cobalt, molybdenum, tungsten, nickel-moly, cobalt-moly, etc. Other catalytic additives which may be added include various crystalline materials.

These may be large pore materials, such as zeolite X, zeolite Y, and mordenite or intermediate pore size materials having a constraint index of 1–12, e.g. ZSM-5, ZSM-11, or relatively small pore size materials such as erionite.

For many processes, the shape selective zeolites are the preferred catalyst additives. Typical of such processes is catalytic hydrowaxing of fuel oils and lubricating oil stocks. Because of the importance of the shape selective zeolite additives, and because the definition of shape selectivity depends upon constraint index, more details will be given about this term and about various shape selective zeolites.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Shape selective zeolites are those having a constraint index in the approximate range of 1 to 12. The constraint index of various zeolites is reported hereafter.

| ZEOLITES | C.I. |
| --- | --- |
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |
| Beta | 0.6 |
| ZSM-14 | 0.5 |
| H-Zeolon | 0.4 |
| REY | 0.4 |
| Amorphous Silica-Alumina | 0.6 |
| Erionite | 38 |

It is to be realized that the above constraint index values typically characterized the specified zeolites but that such are the cumulative result of several variables used in determination and calculation thereof. Thus, for a given zeolite depending on the temperatures employed, usually 275° to 525° C., with accompanying conversion between 10% to 60%, the constraint index may vary within the indicated approximate range of 1 to 12. Likewise, other variables such as the crystal size of the zeolite, the presence of possible occluded contaminants and binders intimately combined with the zeolite may affect the constraint index. The constraint index is approximate.

While the above experimental procedure will enable one to achieve the desired overall conversion of 10% to 60% for the most catalyst samples and represents preferred conditions, it may occasionally be necessary to use somewhat more severe conditions for samples of very low activity, such as those having a very high silica to alumina ratio or high sodium content. In those instances, temperatures above 540° C., a liquid hourly space velocity of less than one, such as 0.1 or less, can be employed in order to achieve a minimum total conversion of about 10%.

Shape selective zeolites defined herein are exemplified by ZSM-5, ZSM-11, ZSM-12, ZSM-35, ZSM-38 and other similar materials.

U.S. Pat. No. 3,702,886 describes ZSM-5; ZSM-11 is described in U.S. Pat. No. 3,709,979; ZSM-12 is described in U.S. Pat. No. 3,832,449; ZSM-35 is described in U.S. Pat. No. 4,016,245; and ZSM-38 is described in U.S. Pat. No. 4,046,859.

The crystalline additive materials discussed above may also contain one or more metallic components. These may be added by conventional techniques, such as ion exchange or impregnation, or the metallic components and crystalline additives may be added to the catalyst precursor before drop formation.

The process of the present invention can be used to produce catalyst beads having a size in the range of 50 microns to ⅛" with a preferred size range of 1/32" to ⅛". Liquid droplets having size in the range 100 microns to 3/8" will harden into beads having the desired size range.

FIG. 6 shows the dimensions for the venturi which are usable for the production of catalyst beads as described herein. In FIG. 6, the following letters denote these dimensions.

A is the capillary (liquid delivery tube) O.D.
A" is the capillary (liquid delivery tube) I.D.
2B is the venturi throat diameter 2C is the venturi exit diameter D is the position of capillary (liquid delivery tube) tip relative to venturi throat mid-point E is the distance from the venturi throat mid-point to venturi exit F is the venturi throat length $\theta$ is the venturi exit half-angle divergence The range of specifications for the venturi, and the dimensions in the exemplary embodiment are given in the table below. In this table, the broad range specifications are those required for production of final, dried product beads having diameters from approximately 50 microns to 3.5 mm. The "preferred range" specifications are those required for production of final, dried product beads having diameters from approximately 1/32" (0.8 mm) to ⅛" (3.2 mm).

Embodiments" in the table above was used with two bead-forming liquids.

EXAMPLE 1

A mixture of 60 g. Chlorhydrol®(50 wt. %), pH=4.0, and 42.6 g. Hexamethylenetetramine (HMT) (28 wt. %), pH =8.0 was mixed thoroughly at 0° C. and maintained at 0° C. in a reservoir prior to being dispensed as uniform droplets through the venturi assembly. ("Chlorhydrol" is a registered trademark for Reheis Chemical Company's brand of aluminum chlorohydrate, with empirical formula $Al_2(OH)_5Cl.2.5H_2O$ and sold as a 50 wt. % aqueous solution.) The droplets were received in a hexadecane receiving bath maintained at 90°–95° C. and were subsequently aged for more than 24 hours.

| | VENTURI SPECIFICATIONS | | | | | | | | | |
|---|---|---|---|---|---|---|---|---|---|---|
| | A | A' | 2B | 2C | D | E | F | $\theta$ | Liquid Flow Rate | Venturi Fluid Flow Rate l/min. |
| Broad Range Specifications | | | | | | | | | | |
| min. | 0.125 | 0.075 | 0.40 | 0.70 | −0.25 | 3.0 | 0.5 | 5.0 | 1 ml/hr. | 0.2 |
| max. | 7.0 | 6.0 | 15.0 | 52.0 | 55.0 | 75.0 | 20.0 | 30.0 | 50 l/hr. | 90 |
| "Preferred Range" Specifications | | | | | | | | | | |
| min. | 1.25 | .75 | .25 | 4.0 | 0 | 5.0 | 2.0 | 7.5 | 75 ml/hr. | 1.0 |
| max. | 6.0 | 5.5 | 12.5 | 36.0 | 40.0 | 65.0 | 17.0 | 22.5 | 40 ml/hr. | 90 |
| Exemplary Embodiments | | | | | | | | | | |
| Run #'s 1,2 | .84 | .51 | 2.5 | 4.3 | 1.5(1) 2.5(2) | 5.8 | 3.0 | 12 | 375 ml/hr(1) 120 ml/hr(2) | 2.0(1) 2.0(2) |
| Run #'s 3,4,7 | .46 | .25 | 1.5 | 2.9 | 1.0(3) .5(4) 1.5(7) | 5.5 | 2.0 | 8.8 | 12 ml/hr(3) 1 ml/hr(4) 10 ml/hr(7) | 1.5(3) 1.4(4) 1.5(7) |
| Run #'s 5,6 | 1.27 | .84 | 2.5 | 4.3 | 2.5(5) 3.5(6) | 5.8 | 3.0 | 12.0 | 75 ml/hr(5) 120 ml/hr(6) | 4.8(5) 4.5(6) |

In the foregoing table, all dimensions are in millimeters. Angles are in degrees. The liquid flow rates are based on materials in a viscosity range of 1–400 cps. The venturi flow rates are based on $N_2$ and may vary substantially for other fluids.

For the best performances of the venturi, the flow through the venturi should be kept laminar.

As an example of the operation of the invention, a venturi having the dimensions listed as "Exemplary

EXAMPLE 2

The same preparation as in Example 1 was used, but with ZSM5-B, as synthesized, dispersed in the chlorhydrol/HMT mixture at a 10 wt. % loading based on $Al_2O_3$.

A summary of the venturi operating conditions and resulting droplet dimensions using the two bead-forming liquids above is given in the following table. Nitrogen was used as the venturi fluid in all cases.

| | | | HYDROGEL DROPLET DATA | | | | |
|---|---|---|---|---|---|---|---|
| Run # | Description | Capillary Size (ga) | Venturi Throat Diam. (mm) | Pump Rate (ml/hr) | $N_2$ Flow (l/mm) | Production Rate (sec$^{-1}$) | Particle Diameter (mm) (Initial/Aged) |
| 1 | Chlorhydrol/HMT | 21 | 2.5 | 375 | 2.0 | 50 | 1.6/.96 |
| 2 | Chlorhydrol/HMT | 21 | 2.5 | 120 | 2.0 | 8 | 2.0/1.2 |
| 3 | Chlorhydrol/HMT | 26 | 1.5 | 12 | 1.5 | 15 | .76/.46 |
| 4 | Chlorhydrol/HMT | 26 | 1.5 | 1 | 1.4 | 7 | .40/.38 |
| 5 | Chlorhydrol/HMT | 18 | 2.5 | 75 | 4.8 | 5 | 2.0/1.8 |
| 6 | Chlorhydrol/HMT/ 10% ZSM5-B | 18 | 2.5 | 120 | 4.5 | 6 | 2.2/— |
| 7 | Chlorhydrol/HMT/ 10% ZSM5-B | 26 | 1.5 | 10 | 1.5 | 10 | .8/— |

While a particular embodiment of the invention has been shown and described, various modifications are within the true spirit and scope of the invention. The appended claims are, therefore, intended to cover all such modifications.

What is claimed is:

1. A method of producing uniform spheroidal beads from a bead-forming liquid comprising:
   supplying said liquid to a capillary tube;
   supplying an immiscible fluid which flows through a venturi throat in which the other end of said capillary tube is positioned;
   detaching uniform, spherical droplets of said bead-forming liquid from the other end of said capillary tube by said flow of said immiscible fluid; and
   hardening said droplets into uniform spheroidal beads.

2. The method recited in claim 1 wherein said bead-forming liquid is a metal oxide-forming liquid and wherein said droplets are hardened into uniform spheroidal metal oxide beads.

3. The method recited in claim 2 wherein said bead-forming liquid is a catalyst-forming liquid and wherein said droplets are hardened into uniform spheroidal catalyst beads.

4. The method recited in claim 2 wherein said bead-forming liquid is a catalyst support-forming liquid and wherein said droplets are hardened into uniform, spheroidal catalyst support beads.

5. The method recited in claim 2 wherein said bead-forming liquid is an adsorbent forming-liquid and wherein said droplets are hardened into uniform, spheroidal adsorbent beads.

6. The method recited in claim 2 wherein said bead-forming liquid is an ion exchange material-forming liquid and wherein said droplets are hardened into uniform, spheroidal beads of ion exchange material.

7. The method recited in claim 1 further comprising:
   controlling the flow of bead-forming liquid to said capillary tube.

8. The method recited in claim 1 wherein said immiscible fluid is a gas further comprising:
   controlling the flow of gas through said venturi throat to control the detachment of said droplets from the end of said capillary tube.

9. The method recited in claim 8 wherein said gas is air.

10. The method recited in claim 8 wherein said gas is ammonia.

11. The method recited in claim 1 wherein said immiscible fluid is a liquid further comprising:
    controlling the flow of said liquid through said venturi throat to control the detachment of said droplets from the end of said capillary tube.

12. The method recited in claim 1 wherein said immiscible fluid is oil, said method further comprising:
    pumping said oil through said venturi throat to detach droplets of said liquid.

13. The method recited in claim 12 further comprising:
    hardening said droplets in an oil bath; and
    recirculating oil from said bath to said venturi throat.

14. The method recited in claim 1 further comprising:
    detaching droplets from a plurality of capillary tubes with the end of each tube positioned in a venturi throat;
    hardening the droplets from said capillary tubes in a common vessel.

* * * * *